(12) United States Patent
Ojima

(10) Patent No.: US 8,939,189 B2
(45) Date of Patent: Jan. 27, 2015

(54) VEHICLE WINDOW SHADE DEVICE

(75) Inventor: Shinya Ojima, Settsu (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 0 days.

(21) Appl. No.: 13/695,991

(22) PCT Filed: Jun. 6, 2011

(86) PCT No.: PCT/JP2011/062879
§ 371 (c)(1),
(2), (4) Date: Nov. 2, 2012

(87) PCT Pub. No.: WO2011/155420
PCT Pub. Date: Dec. 15, 2011

(65) Prior Publication Data
US 2013/0048228 A1    Feb. 28, 2013

(30) Foreign Application Priority Data

Jun. 11, 2010 (JP) ................. 2010-133847

(51) Int. Cl.
*A47H 1/00* (2006.01)
*E06B 9/08* (2006.01)
(Continued)

(52) U.S. Cl.
CPC .............. *B60J 1/2022* (2013.01); *B60J 1/2072* (2013.01); *B60J 1/2083* (2013.01)
USPC ...................... 160/120; 160/370.22; 296/97.8

(58) Field of Classification Search
CPC .......... B60J 1/2022; B60J 1/2019; B60J 1/08; B60J 1/10; B60J 1/20; B60J 1/2013; B60J 1/2069; B60J 1/2086; B60J 1/2027
USPC ............ 160/DIG. 2, 265, 270, 271, 273, 274, 160/241, 370.22, 120, 122; 296/97.4, 97.7, 296/97.142, 143, 97.8, 97.9, 97.11
See application file for complete search history.

(56) References Cited

U.S. PATENT DOCUMENTS 4,838,108 A * 6/1989 Flanhardt et al. ................ 74/417
6,910,518 B2 * 6/2005 Zimmermann et al. . 160/370.22
(Continued)

FOREIGN PATENT DOCUMENTS

| CN | 101264728 A | 9/2008 |
|---|---|---|
| DE | 103 34 721 A1 | 2/2005 |

(Continued)

OTHER PUBLICATIONS

Written Opinion issued Sep. 6, 2011 in PCT/JP2011/062879 filed Jun. 6, 2011 (with English-language translation).
(Continued)

*Primary Examiner* — Katherine Mitchell
*Assistant Examiner* — Jeremy Ramsey
(74) *Attorney, Agent, or Firm* — Oblon, Spivak, McClelland, Maier & Neustadt, L.L.P.

(57) ABSTRACT

A window shade device for vehicles covers a first window and a second window provided adjacent to each other to be shielded and opened. The window shade device for vehicles includes: a guide and support mechanism including a guide rail disposed along a drawing/housing direction of the second window shade and a movable member movable along the guide rail; a rack member connected with the movable member and configured to move along the guide rail; and an intermediate transmission mechanism including a first bevel gear and a second bevel gear and transmitting the rotation of a windup shaft member of the first windup device as a force for moving the rack member along the guide rail, the first bevel gear being connected to the windup shaft member so as to rotate in association therewith, the second bevel gear being disposed to mesh with the first bevel gear.

4 Claims, 10 Drawing Sheets

(51) Int. Cl.
*B60J 1/20* (2006.01)
*B60J 3/00* (2006.01)
*B60J 11/00* (2006.01)

(56) References Cited

U.S. PATENT DOCUMENTS

| | | | |
|---|---|---|---|
| 7,347,246 B2 * | 3/2008 | Ayran | 160/370.22 |
| 7,828,040 B2 * | 11/2010 | Miyachi et al. | 160/370.22 |
| 7,934,764 B2 * | 5/2011 | Hansen | 296/97.8 |
| 2003/0094249 A1 | 5/2003 | Zimmermann et al. | |
| 2005/0126724 A1 | 6/2005 | Ayran | |
| 2006/0260771 A1 * | 11/2006 | Takeuchi et al. | 160/370.22 |
| 2008/0223534 A1 * | 9/2008 | Hansen | 160/370.22 |

FOREIGN PATENT DOCUMENTS

| | | |
|---|---|---|
| JP | 2003-182358 A | 7/2003 |
| JP | 2005-145444 A | 6/2005 |
| JP | 2009-120193 A | 6/2009 |

OTHER PUBLICATIONS

International Search Report issued Sep. 6, 2011 in PCT/JP2011/062879 filed Jun. 6, 2011.
Office Action issued Mar. 18, 2014 in Japanese Patent Application No. 2010-133847 with English language translation.
Combined Chinese Office Action and Search Report issued Jul. 22, 2014 in Patent Application No. 201180028869.1 (with English language translation based on the Japanese translation).

* cited by examiner

VEHICLE WINDOW SHADE DEVICE

TECHNICAL FIELD

The present invention relates to a window shade device for vehicles that covers windows of a vehicle to be shielded and opened.

BACKGROUND ART

Patent Document 1 discloses the window shade device including two winding shafts arranged relative to one another at arbitrary angles.

As to the window shade device disclosed in Patent Document 1, two configurations in which one winding shaft is rotated in association with the rotation of the other winding shaft are disclosed.

In the first configuration, a threaded spindle is connected to the one winding shaft, and a spindle nut is screwed with this threaded spindle. Then, the winding shaft is rotated for opening/closing one sheet, the spindle nut screwed with the threaded spindle moves along the axial direction of the threaded spindle, so that the other sheet is opened/closed.

In the second configuration, the one winding shaft and the other winding shaft are coupled to each other to rotate in synchronism via a bevel gear wheel. The leading edge of the sheet wound around the other winding shaft is biased in a drawing direction by a tension spring. Then, when the one winding shaft rotates in the direction in which the one sheet is drawn, the other winding shaft rotates in synchronism in the direction in which the sheet is drawn. Accordingly, the sheet wound around the other winding shaft is drawn by a tensile force of the tension spring. Meanwhile, when the one winding shaft rotates in the direction in which the other sheet is wound up, the other winding shaft rotates in synchronism to wind up the sheet.

PRIOR ART DOCUMENT

Patent Document

Patent Document 1: Japanese Patent Application Laid-Open No. 2003-182358

SUMMARY OF THE INVENTION

Problem to be Solved by the Invention

Unfortunately, according to the first configuration disclosed in Patent Document 1, it is required to dispose the other winding shaft and the threaded spindle in the same straight line, which places severe constraints on a layout.

According to the second configuration disclosed in Patent Document 1, a configuration is made such that the other winding shaft is associated in association with the rotation of the one sheet wound up, and the sheet is drawn by the tensile force of the tension spring. As a result, if the portion of the tension spring, which transmits the tensile force, is caught, the sheet may not be drawn even when the other winding shaft rotates, leading to a fear that the operation of drawing the sheet may become unreliable.

Therefore, the present invention has an object to provide an excellent flexibility in layout and perform an operation of drawing a sheet more reliably.

Means to Solve the Problem

In order to solve the above-mentioned problem, a first aspect relates to a window shade device for vehicles that covers a first window and a second window provided adjacent to each other in a vehicle to be shielded and opened, which includes: a first window shade configured to shield the first window; a first windup device including a windup shaft member configured to wind up the first window shade and winding up the first window shade to be drawn/housed from/in the windup shaft member; a second window shade configured to shield the second window; a second windup device disposed in a position of intersecting an axis of the windup shaft member of the first windup device and winding up the second window shade to be drawn/housed therefrom/therein; a guide and support mechanism including a guide path member to be disposed along a drawing/housing direction of the second window shade and a movable member supported to be movable along the guide path member; a rack member connected with the movable member, disposed to be movable along the guide path member, and moving the movable member along the guide path member by the movement along the guide path member; and an intermediate transmission mechanism including a first bevel gear connected to the windup shaft member of the first windup device to rotate in association therewith and a second bevel gear disposed to mesh with the first bevel gear and be associated with said rack member, and transmitting the rotation of the windup shaft member of the first windup device as a force for moving said rack member along the guide path member.

In a second aspect, in the window shade device for vehicles according to the first aspect, the first bevel gear and the second bevel gear are disposed to mesh with each other in a position in which axes of rotation thereof are disposed not to be orthogonal to each other, and the rack member is provided to be movable along a direction in which the rack member is tilted with respect to the axis of the windup shaft member of the first windup device.

In a third aspect, in the window shade device for vehicles according to the first or second aspect, a spur gear having an axis of rotation that coincides with the axis of rotation of the second bevel gear is integrated with the second bevel gear, and the spur gear is disposed to mesh with the rack member.

In a fourth aspect, in the window shade device for vehicles according to the third aspect, the spur gear and the rack member mesh with each other at a position offset from the axis of the windup shaft member of the first windup device.

In a fifth aspect, in the window shade device for vehicles according to any one of the first to fourth aspects, the first bevel gear is directly connected to the windup shaft member of the first windup device.

In a sixth aspect, in the window shade device for vehicles according to any one of the first to fifth aspects, a guide member for escaping that guides a portion of the rack member is provided along the first windup device, the portion extending from the guide path member.

Effects of the Invention

According to the first aspect, the force due to the rotation of the first windup device is transmitted as the force for moving the rack member along the guide path member, through meshing of the first bevel gear and the second bevel gear. Therefore, the position in which the windup shaft member of the first windup device and the rack member or the guide path member are provided can be set relatively freely, which is excellent in flexibility in layout.

Moreover, the configuration is made such that the rack member moves along the guide path member upon the rotation of the windup shaft member of the first windup device, and that the second window shade is drawn in association with this, which enables to perform the operation of drawing a sheet more reliably.

According to the second aspect, the position in which the first bevel gear and the second bevel gear mesh with each other is adjusted, which makes it easy to dispose the windup shaft member and the rack member by appropriately adjusting the moving directions thereof in accordance with the positions of the first window and the second window, the layout of the peripheral members thereof, and the like.

According to the third aspect, the rotation of the second bevel gear can be transmitted as the force for moving the rack member with a relatively simple configuration. Moreover, the arrangement layout of the rack member can be freely changed by appropriately adjusting the position at which the spur gear and the rack member mesh with each other on the axis of rotation of the second bevel gear.

According to the fourth aspect, the spur gear and the rack member mesh with each other at a position offset from the axis of the first windup shaft member, which enables to dispose a moving path of the rack member, the guide path member, and the like in accordance with the positions of the first window and the second window, the layout of peripheral members thereof, and the like.

According to the fifth aspect, the rotation from the first windup shaft member to the first bevel gear can be transmitted with a relatively simple configuration.

According to the sixth aspect, the portion of the rack member, which extends from the guide path member, can be guided with a relatively compact configuration.

EMBODIMENT FOR CARRYING OUT THE INVENTION

<Overall Configuration>

Figure 1:
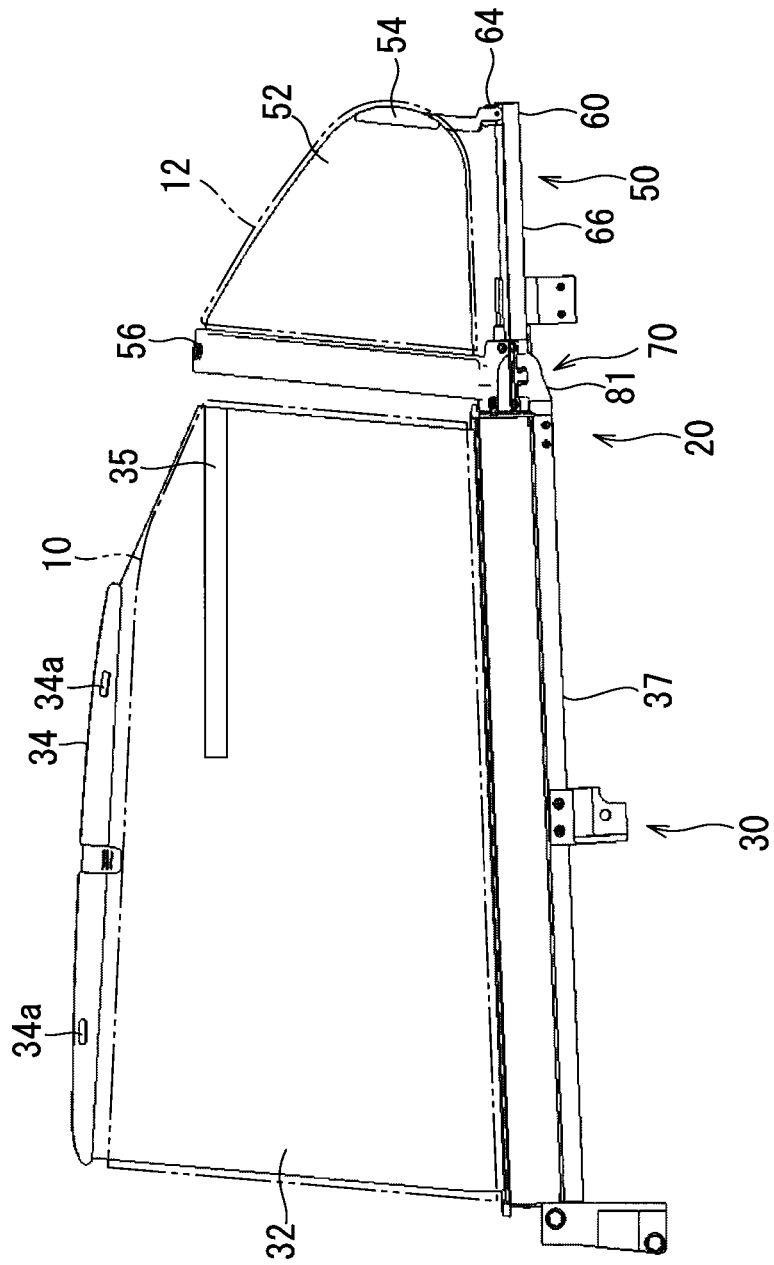
FIG. 1 is a side view showing a window shade device for vehicles in a drawn state.
Figure 2:
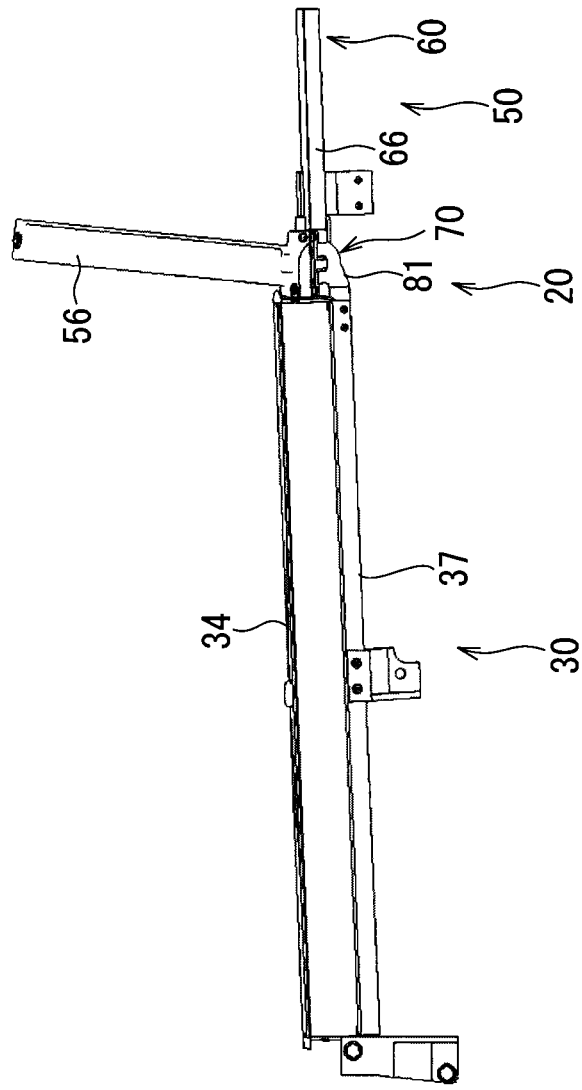
FIG. 2 is a side view showing the window shade device for vehicles in a housed state.

Hereinbelow, a window shade device for vehicles according to an embodiment is described. FIG. 1 is a side view showing a window shade device for vehicles 20 in a drawn state, and FIG. 2 is a side view showing the window shade device for vehicles 20 in a housed state. FIGS. 1 and 2 show the state when viewed from an inside of a vehicle.

The window shade device for vehicles 20 is incorporated into windows 10 and 12 provided adjacent to each other in a vehicle, and is configured so as to cover the windows 10 and 12 from an inside of the room to be shielded and released. Here, the rear side window 10 (first window) having an approximately square shape is provided in the vehicle, and the rear quarter window 12 (second window) having an approximately triangular shape is provided in adjacent to the rear side window 10 on the back side of the vehicle further from the rear side window 10.

The window shade device for vehicles 20 includes a first window shade mechanism 30 for covering the rear side window 10 and a second window shade mechanism 50 for covering the rear quarter window 12, which is configured such that the second window shade mechanism 50 performs the drawing/housing operation in association with the drawing/housing operation of the first window shade mechanism 30.

Hereinbelow, the first window shade mechanism 30 and the second window shade mechanism 50 are described, and then, the configuration of the shade associating mechanism 70 for associating the operations is described.

<First Window Shade Mechanism>

The first window shade mechanism 30 includes a first window shade 32 and a first windup device 36.

The first window shade 32 is formed of fabric, a resin sheet, or the like into a shape capable of shielding the rear side window 10. Here, the first window shade 32 is formed to have approximately the same size and shape as those of the rear side window 10. A rod-shaped stay 34 made of resin, metal, or the like is mounted to the leading edge of the first window shade 32. Provided to the stay 34 is a hook part 34a that can be hooked to a vehicle side portion located above the rear side window 10 in the state in which the first window shade is drawn.

Here, the formation is made such that the leading edge portion of the first window shade 32 is gradually tilted downward in the state in which the first window shade 32 is drawn along the rear side window 10. The stay 34 is provided from the middle portion to the front portion of the leading edge portion of the first window shade 32 but is not provided in the rear portion of the leading edge portion of the first window shade 32. Therefore, the rear portion of the first window shade 32 may hang down in the state in which the first window shade 32 is drawn. For this reason, an auxiliary stay 35 that is formed of a resin plate, a metal plate, or the like and has an elongated shape is mounted in a position of being approximately parallel to the stay 34 from the upper rear corner portion of the first window shade 32 toward the front thereof. This prevents the rear portion of the first window shade from hanging down in the state in which the first window shade is drawn. The auxiliary stay 35 is approximately parallel to the stay 34 and the windup shaft member 38 of the first windup device 36, which does not become an obstacle when the first window shade 32 is wound up and housed and is wound up together with the first window shade 32.

Figure 4:
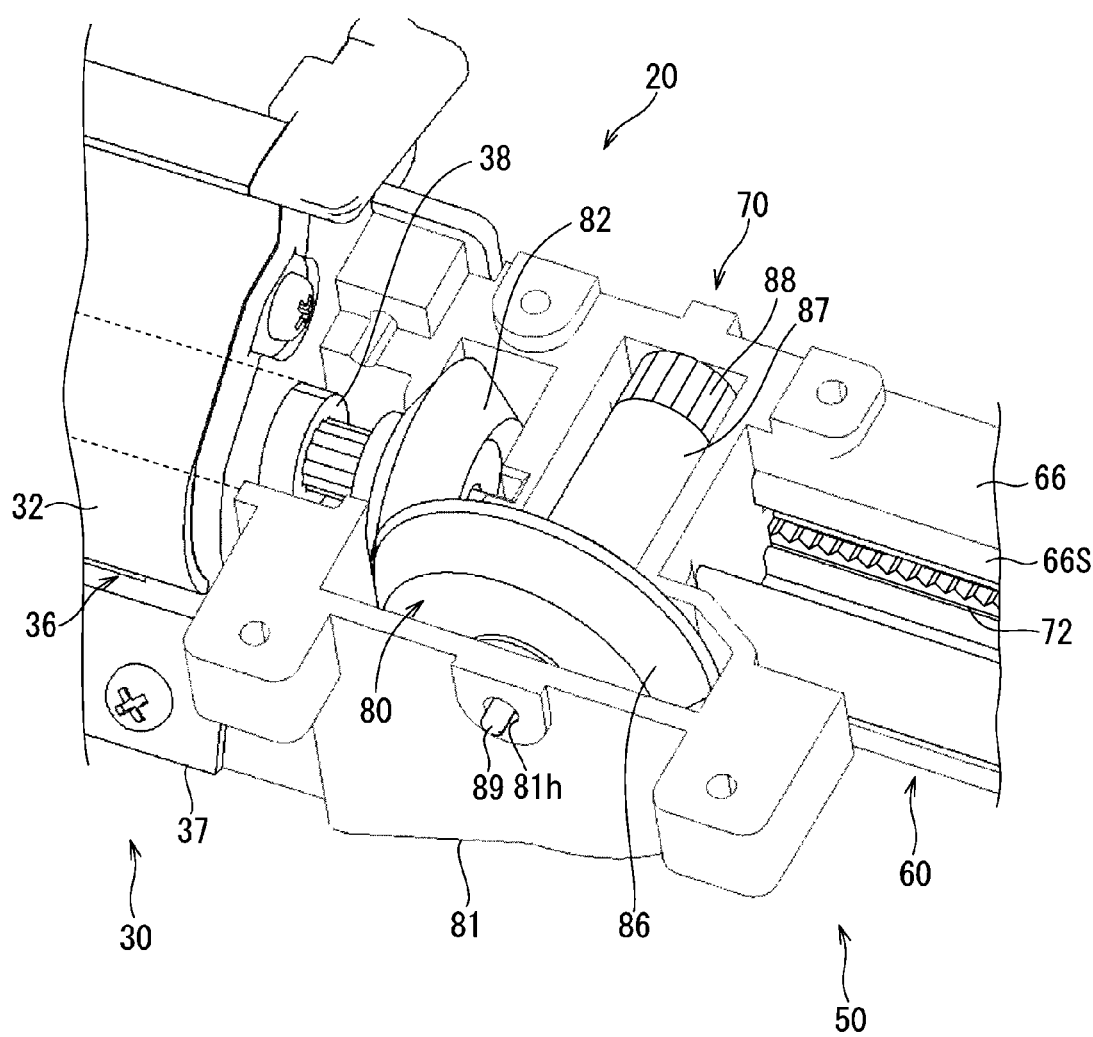
FIG. 4 is a partially exploded perspective view showing a shade associating mechanism.

The first windup device 36 includes the windup shaft member 38 capable of winding up the first window shade 32 and is configured so as to wind up the first window shade 32 to be drawn/housed (see, for example, FIG. 4 as to the windup shaft member 38).

That is, the first windup device 36 is supported in a case 37 formed of a resin, metal, or the like such that the windup shaft member 38 capable of winding up the first window shade 32 can rotate in a drawing/housing direction. The windup shaft member 38 is biased in the direction of winding up the first window shade 32 by a windup biasing member (not shown) such as a coil spring. When the stay 34 is pulled, the first window shade is drawn from the first windup device 36. Meanwhile, when the force for pulling the stay 34 is released, the first window shade 32 is wound up and housed by the biasing force acting on the windup shaft member 38 in the windup direction. The first windup device 36 is incorporated into a vehicle along the lower edge of the rear side window 10. The first window shade 32 is drawn from underneath the rear side window 10 in this incorporated state, whereby the first window shade 32 can shield approximately the whole of the rear side window 10.

<Second Window Shade Mechanism>

Figure 3:
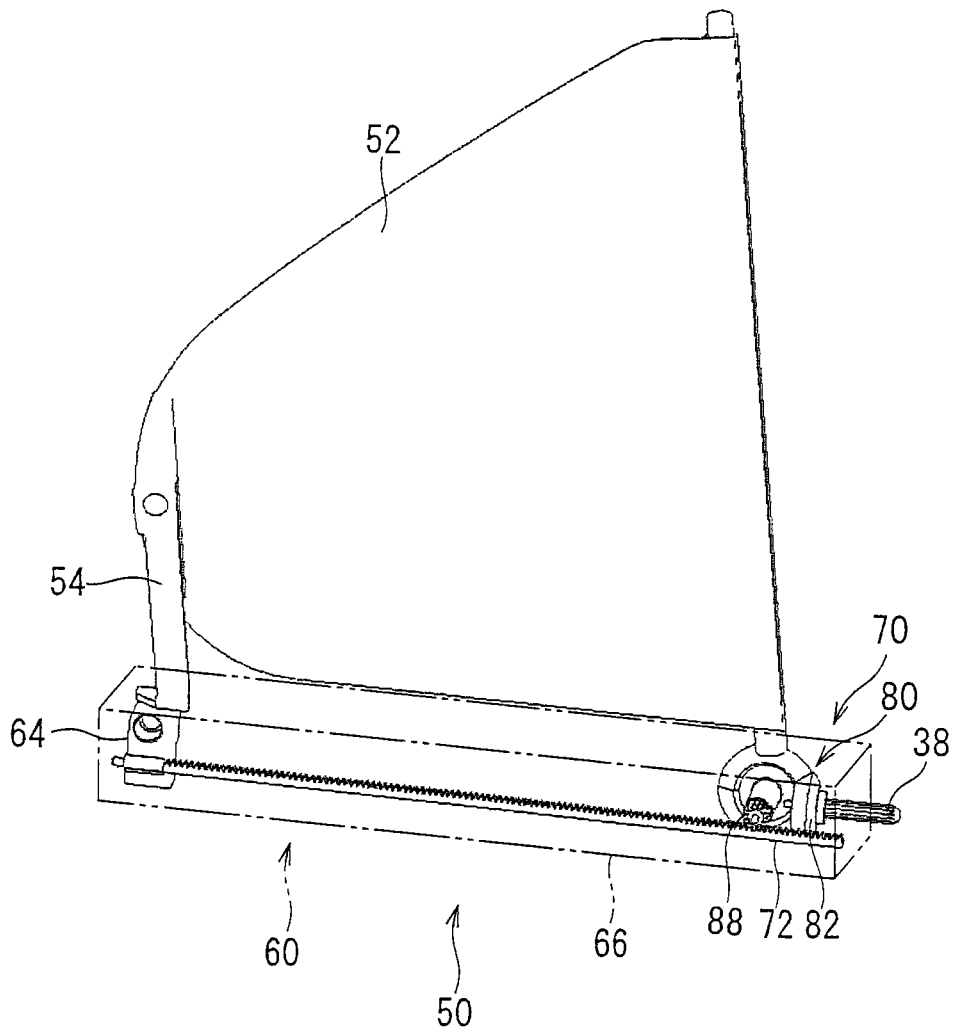
FIG. 3 is an explanatory view showing a second window shade device.

FIG. 3 is an explanatory view showing the second window shade mechanism 50. FIG. 3 shows the state when viewed from the outside of a room.

As shown in FIGS. 1 to 3, the second window shade mechanism 50 includes a second window shade 52, a second windup device 56, and a guide and support mechanism 60.

The second window shade 52 is formed of fabric, a resin sheet, or the like into a shape capable of shielding the rear quarter window 12. Here, the second window shade 52 is formed into an approximately triangular shape in which a leading edge thereof is rounded correspondingly to the shape of the rear quarter window 12. Mounted to the leading edge of the second window shade 52 is a quarter stay 54 that is formed of a resin or the like and has an approximately rod shape.

The second windup device 56 winds up the second window shade 52 to be drawn/housed along an approximately horizontal direction. That is, the second windup device 56 includes a windup shaft member capable of winding up the second window shade 52, and the windup shaft member biases the second window shade 52 in the windup direction by a windup biasing member (not shown) such as a coil spring. Also, the second windup device 56 is disposed in a position of intersecting the axis of the windup shaft member 38 of the first windup device 36, in this case, in a position of being approximately orthogonal thereto. Here, one end (lower end) of the second windup device 56 is connected and fixed to one end (rear end) of the first windup device 36 by screwing or the like, so that the above-mentioned position is maintained. When the quarter stay 54 is pulled, the second window shade 52 is drawn from the second windup device 56. Meanwhile, the force for pulling the quarter stay 54 is released, the second window shade 52 is wound up and housed by the biasing force of the windup shaft member toward the windup direction. The second windup device 56 is mounted and fixed along, for example, a pillar between the rear side window 10 and the rear quarter window 12. When the second window shade 52 is drawn from the front of the rear quarter window 12, the second window shade 52 can shield approximately the whole of the rear quarter window 12.

Needless to say, the first windup device 56 does not need to be approximately orthogonal to the axis of the windup shaft member 38 of the first windup device 36 but may be positioned obliquely. For example, the second windup device 56 may be disposed along the position of the pillar between the rear side window 10 and the rear quarter window 12 or the position of the front edge portion of the rear quarter window 12.

The guide and support mechanism 60 includes a guide rail 66 serving as a guide path member and a movable member 64.

The guide rail 66 is configured so as to be disposed along the drawing/housing direction of the rear quarter window 12, and the movable member 64 is supported by the guide rail 66 so as to move along the extending direction thereof.

More specifically, the guide rail 66 is formed into an approximately tube shape (approximately square tube shape), and a slit 66S extending along the longitudinal direction of the guide rail 66 is formed on one side surface (here, the surface facing upward) thereof (see FIG. 4). Incorporated into one end (front end) of the guide rail 66 is a shade associating mechanism 70 described below. The guide rail 66 is fixed to the other end (rear end) of the first windup device 36 by screwing or the like via the incorporated portion of the shade associating mechanism 70. As a result, the guide rail 66 is fixed to the back of the first windup device 36 on the extension thereof. The guide rail 66 is incorporated into a vehicle together with the first windup device 36, the second windup device 56, and the like, and is disposed in the portion of a car body, which is located underneath the rear quarter window 12, along the lower edge of the rear quarter window 12. The relationship of arrangement among the guide rail 66 and a rack member described below with respect to the first windup device 36 is described below in more detail.

The movable member 64 is supported so as to move along the drawing/housing direction of the second window shade 52 by the guide rail 66. More specifically, the movable member 64 is disposed in the guide rail 66 in a movable manner.

The quarter stay 54 is connected to the movable member 64 so as to move in accordance with the movement of the movable member 64. Here, one end (lower end) of the quarter stay 54 is incorporated into the guide rail 66 via the slit 66S and is fixed in a constant position with respect to the movable member 64. The movable member 64 and the quarter stay 54 are not necessarily required to be in a constant position with respect to each other, which only need to be configured such that for example, the quarter stay 54 moves in association with the movement of the movable member 64 for drawing and housing the second window shade 52. When the movable member 64 moves backward along the guide rail 66, in association with this, the quarter stay 54 moves along the drawing direction of the second window shade 52. As a result, the second window shade 52 is drawn to shield the rear quarter window 12. Meanwhile, when the movable member 64 moves forward along the guide rail 66, in association with this, the quarter stay 54 moves along the housing direction of the second window shade 52. Then, the second window shade 52 is wound up and housed by the second windup device 56.

<As to Shade Associating Mechanism>

Description is given of the shade associating mechanism 70 for causing the second window shade mechanism 50 to perform a drawing/housing operation in association with the drawing/housing operation of the first window shade mechanism 30.

Figure 5:
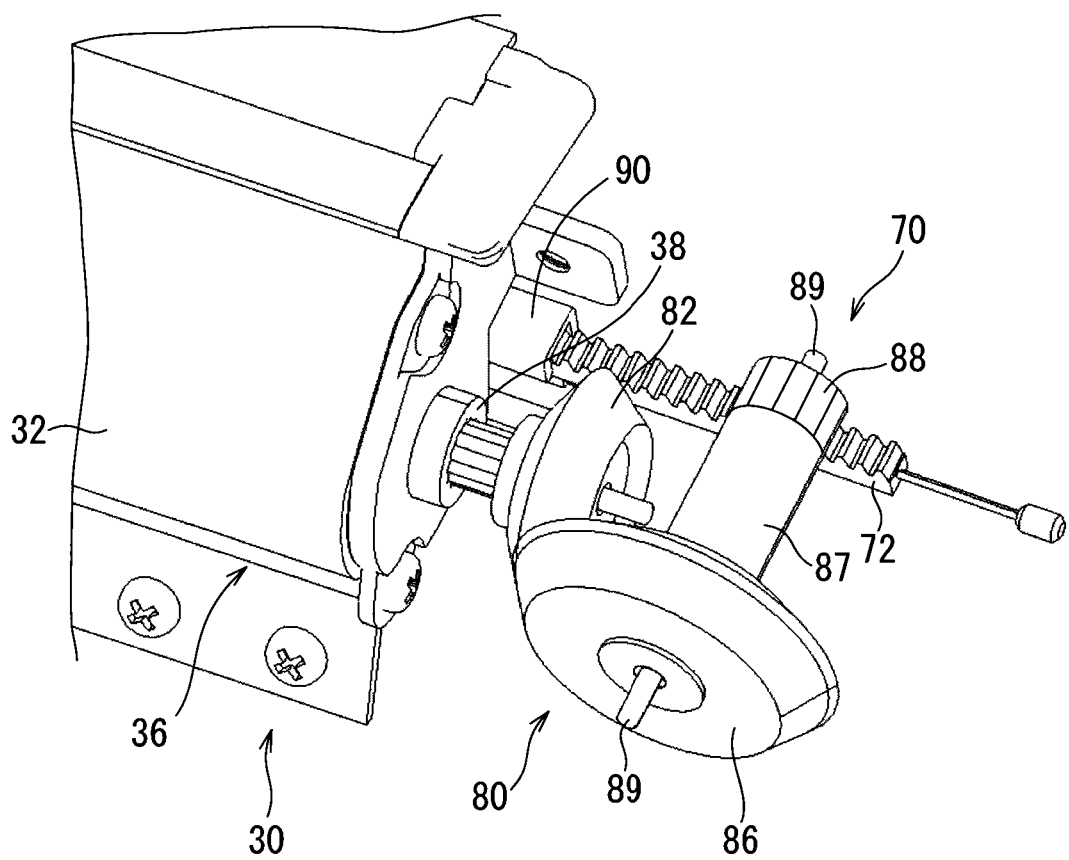
FIG. 5 is an explanatory view showing an internal configuration of the shade associating mechanism.
Figure 6:
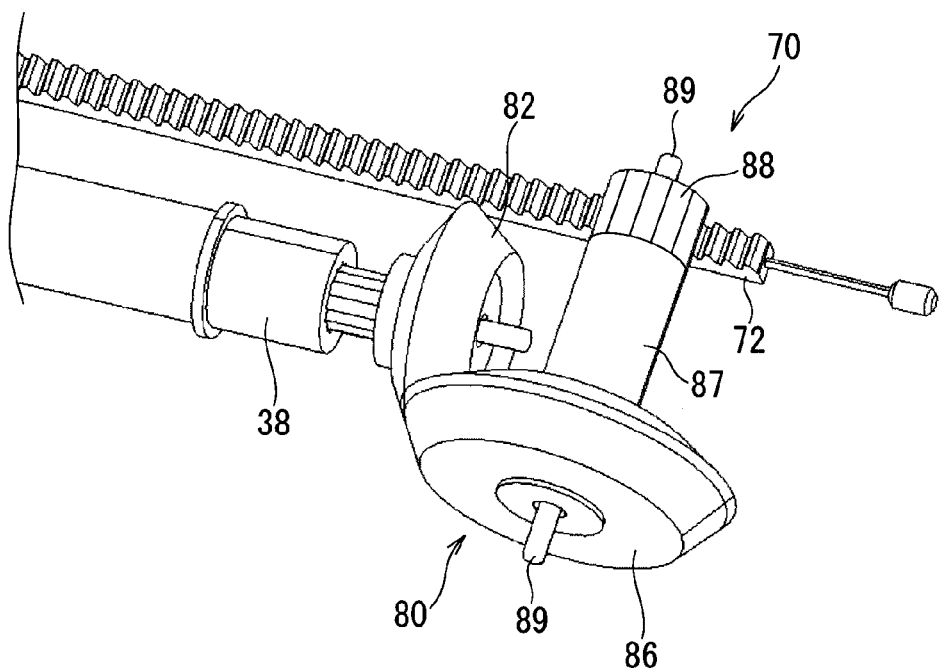
FIG. 6 is another explanatory view showing the internal configuration of the shade associating mechanism.
Figure 7:
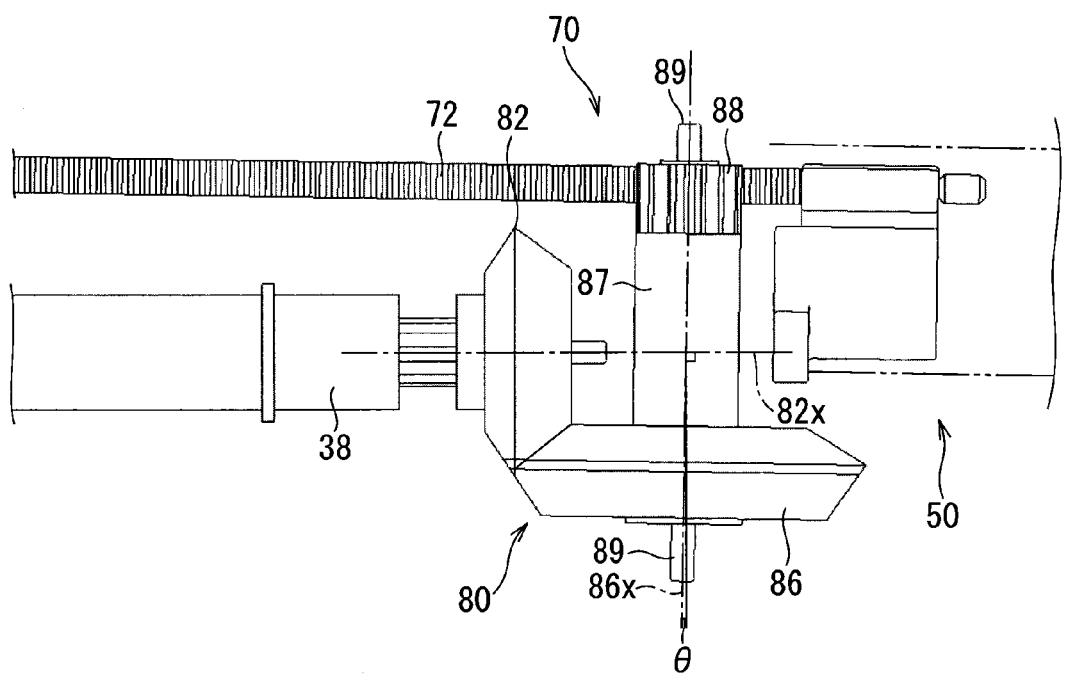
FIG. 7 is still another explanatory view showing the internal configuration of the shade associating mechanism.
Figure 8:
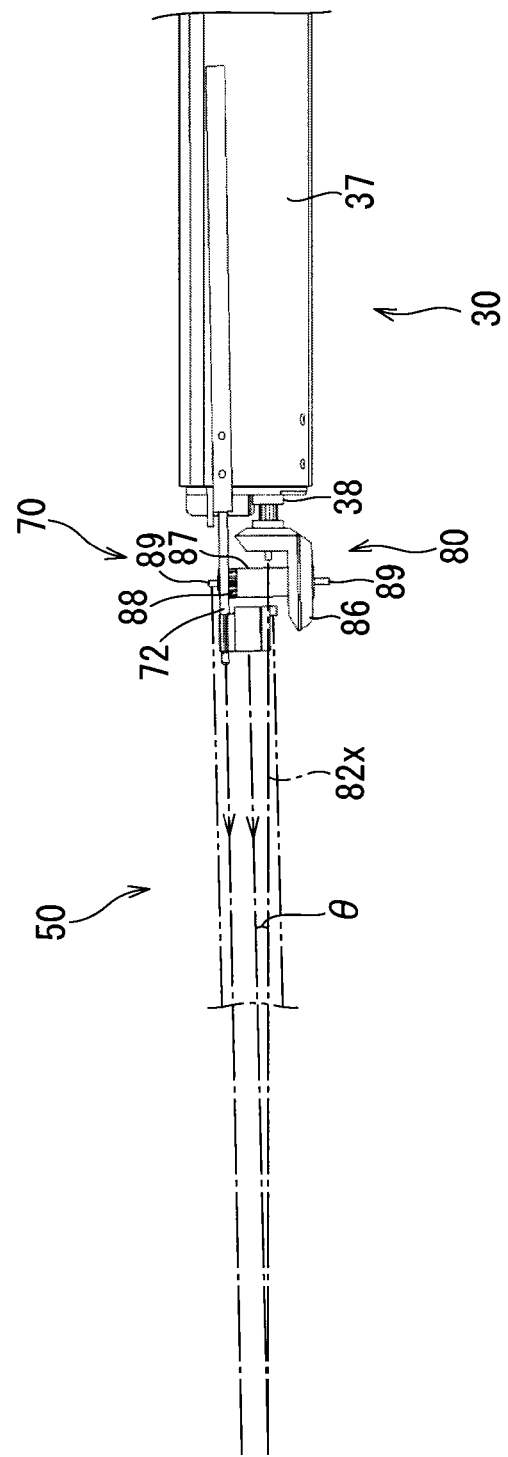
FIG. 8 is an explanatory view showing the relationship of arrangement among a windup shaft member of a first windup device, a rack member, and a guide rail.

FIG. 4 is a partially exploded perspective view showing the shade associating mechanism 70, FIGS. 5 to 7 are explanatory views showing the internal configuration of the shade associating mechanism 70, and FIG. 8 is an explanatory view showing the relationship of arrangement among the windup shaft member 38 of the first windup device 36, a rack member 72, and the guide rail 66. FIGS. 5 and 6 are views showing the internal configuration of the shade associating mechanism 70 from obliquely upward, and FIG. 7 is a view showing the internal configuration of the shade associating mechanism 70 from upward.

That is, the shade associating mechanism 70 includes the rack member 72 and an intermediate transmission mechanism 80.

The rack member 72 is disposed in the guide rail 66 so as to move along the longitudinal direction thereof. The rack member 72 and the movable member 64 are connected to each other in the guide rail 66. The configuration is made such that when the rack member 72 moves along the guide rail 66, the movable member 64 moves in the drawing/housing direction along the guide rail 66 in accordance with the moving direction thereof.

More specifically, the rack member 72 is linearly formed, and a plurality of teeth are formed such that irregularities are in line on one surface thereof. The rack member 72 may be formed of a member having flexibility, such as a resin, which preferably has rigidity to such an extent that it is not bent easily when being pushed. The rack member 72 is disposed in a groove-shaped space of the guide rail 66 in a position in which the plurality of teeth thereof are directed in a predetermined direction (here, upwardly), which is disposed so as to move along the longitudinal direction of the guide rail 66 in the groove-shaped space. The movable member 64 is fixed to one end of the rack member 72 in the guide rail 66. The movable member 64 and the rack member 72 are fixed to each other by various fixing structures such as a sandwich structure and screwing. The rack member 72 passes through the guide rail 66, passes through the distal-end-side opening thereof, and extends outwardly, which is disposed so as to move along the longitudinal direction thereof. The configuration of guiding the extending portion on the other end side of the rack member 72 is described below.

The rack member 72 is moved to advance and retract along the longitudinal direction thereof, whereby the movable member 64 and the quarter stay 54 move. Accordingly, the second window shade 52 is drawn and housed.

The intermediate transmission mechanism 80 includes a first bevel gear 82 and a second bevel gear 86. The first bevel gear 82, the second bevel gear 86, and the like are incorporated into an intermediate case 81 provided on the first windup device 36 side with respect to the guide rail 66. FIG. 4 shows the state in which an upper lid of the intermediate case 81 is removed. The rotation of the windup shaft member 38 of the first windup device 36 is transmitted as the force for moving the rack member 72 along the guide rail 66, through meshing of the first bevel gear 82 and the second bevel gear 86.

That is, the first bevel gear 82 is connected to the windup shaft member 38 of the first windup device 36 so as to rotate in association with the windup shaft member 38. Here, the first bevel gear 82 is directly connected to the windup shaft member 38 of the first windup device 36, to thereby rotate integrally with the windup shaft member 38. Needles to say, another spur gear, another transmission belt, or the like may be provided between the first bevel gear 82 and the windup shaft member 38. That is, it suffices that the first bevel gear 82 rotates in accordance with the rotation timing and rotation direction of the windup shaft member 38.

The second bevel gear 86 is disposed so as to mesh with the first bevel gear 82 and be associated with the rack member 72. Here, the second bevel gear 86 is disposed in the position in which an axis of rotation 82X of the first bevel gear 82 and an axis of rotation 86X of the second bevel gear 86 are disposed (see FIG. 7) not to be orthogonal to each other (that is, in the position in which an angle between the axes is not square).

Here, the axis of rotation 86X of the second bevel gear 86 is disposed in a horizontal plane including the axis of rotation 82X of the first bevel gear 82, and the second bevel gear 86 is disposed so as to mesh with first bevel gear 82 from one direction on the side of the first windup device 36. The axis of rotation 82X of the first bevel gear 82 and the axis of rotation 86X of the second bevel gear 86 intersect each other at an angle smaller than 90° by θ° (that is, (90-θ)°).

Integrally formed with the second bevel gear 86 is a spur gear 88 having an axis of rotation that coincides with the axis of rotation 86× thereof. More specifically, a rod-like shaft 87 is provided to stand on the second bevel gear 86 toward the axis of rotation 82X side of the first bevel gear 82, and the spur gear 88 is formed at the tip of the shaft 87. The spur gear 88 is disposed in the windup-shaft-member-38-side portion of the guide rail 66 so as to mesh with the rack member 72. That is, it suffices that the second bevel gear 86 and the spur gear 88 are integrated with each other in the state of having the axes of rotation that coincide with each other, and for example, a shaft in which teeth are not formed may be provided therebetween. When the spur gear 88 rotates through the rotation of the second bevel gear 86, the rotation movement is transmitted as the force for linearly moving the rack member 72 along the guide rail 66.

On this occasion, the angle between the axes of the first bevel gear 82 and the second bevel gear 86 is not square, whereby it is possible to provide the rack member 72 that meshes with the spur gear 88 to be movable along the direction in which the rack member 72 is tilted with respect to the axis of the windup shaft member 38 of the first windup device 36 by θ° (see FIG. 8). Also, the guide rail 66 is connected and fixed to the first windup device 36 in a position of being tilted to the axis of the windup shaft member 38 by θ° in accordance with the tilt (see FIG. 8). This enables to dispose the rack member 72 in the positional relationship in which the extending direction of the first windup device 36 and the extending direction of the guide rail 66 are tilted. The moving direction of the rack member 72 and the longitudinal direction of the guide rail 66 with respect to the axis of the windup shaft member 38 can be easily adjusted by appropriately setting the angle between the axes (90-θ) of the first bevel gear 86 and the second bevel gear 86.

The shaft 87 is set to have a length dimension enough to extend from the second bevel gear 86 across the axis of rotation 82X of the first bevel gear 82. Accordingly, the spur gear 88 and the rack member 72 can mesh with each other at a position offset from the axis of the windup shaft member 38 of the first windup device 36. The position of the spur gear 88 is appropriately changed in this manner, whereby it is possible to easily adjust the position to which the rack member 72 moves.

The second bevel gear 86 and the spur gear 88 are rotatably supported by fitting small-diameter projections 89 that are formed at both ends thereof along the axis of rotation 82X direction into hole portions 81h formed in the intermediate case 81 (see FIG. 4).

Needless to say, the mode in which the force is transmitted from the second bevel gear 86 to the rack member 72 is not limited to the example described above, and the configuration may be made such that, for example, another gear wheel, transmission belt, or the like is provided therebetween.

Figure 9:
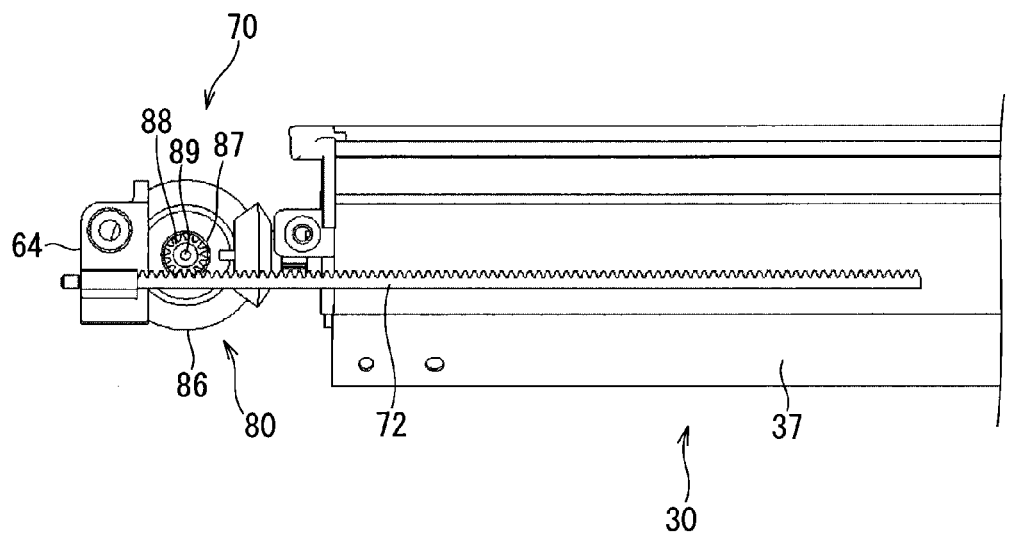
FIG. 9 is an explanatory view showing a state in which the rack member is extended with respect to the first windup device when viewed from the side.
Figure 10:
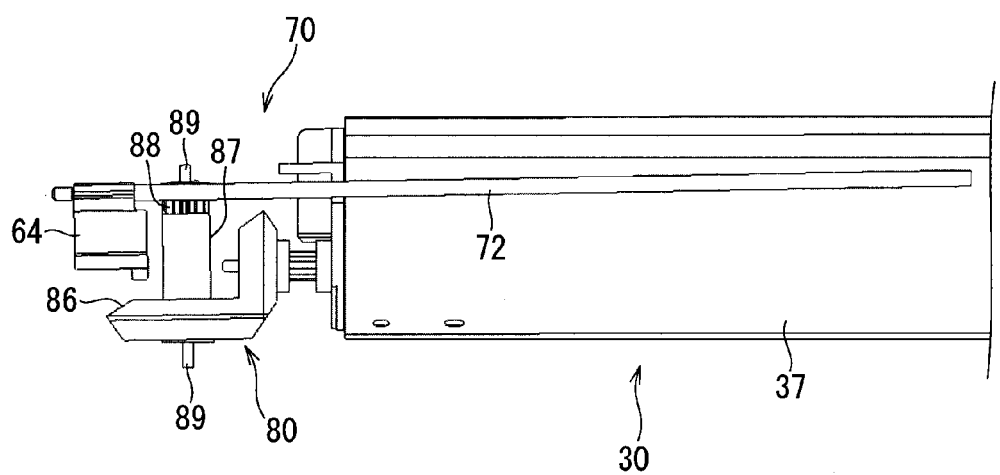
FIG. 10 is an explanatory view showing the state in which the rack member is extended with respect to the first windup device when viewed from the bottom.
Figure 11:
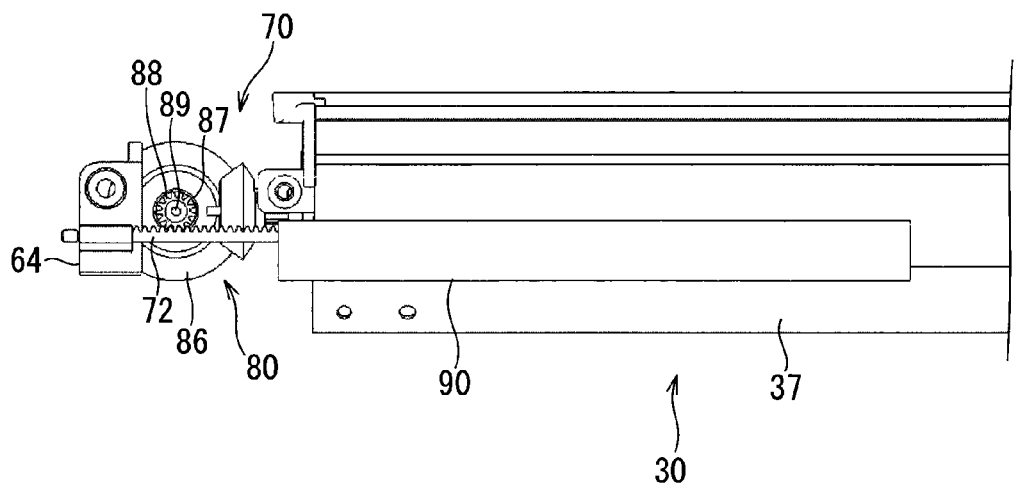
FIG. 11 is an explanatory view showing a guide member for escaping that is mounted to the first windup device when viewed from the side.
Figure 12:
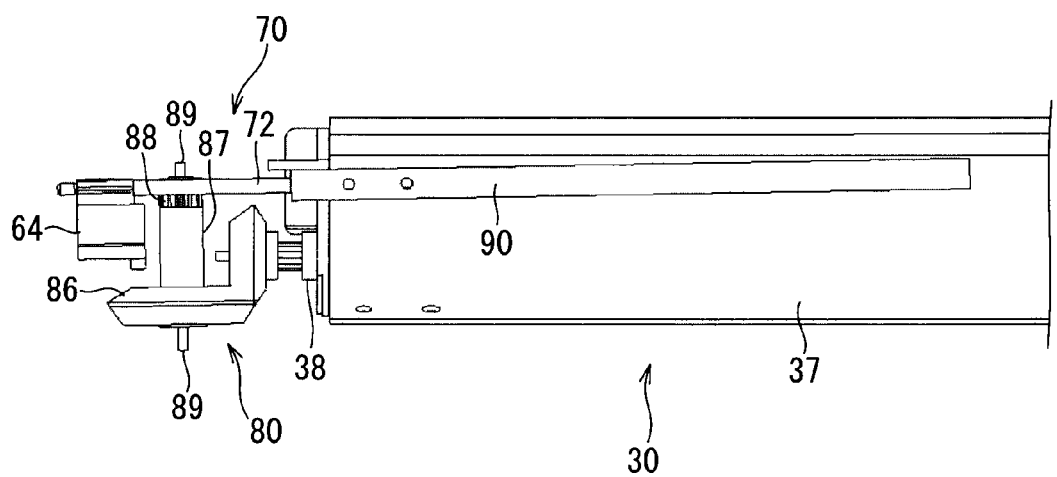
FIG. 12 is an explanatory view showing the guide member for escaping that is mounted to the first windup device when viewed from the bottom.

Incidentally, the rack member 72 is disposed so as to move along the guide rail 66. In the state in which the movable member 64 becomes close to the second bevel gear 86, as shown in FIGS. 9 and 10, the other end of the rack member 72 extends toward the first windup device 36 side from the guide rail 66. Therefore, as shown in FIGS. 8, 11, and 12, a guide member for escaping 90 is provided for guiding a portion of the rack member 72, which extends from the guide rail 66. The guide member for escaping 90 is formed into a tube-like member such that the rack member 72 can be movably disposed therein, and is provided along the first windup device 36. Here, the guide member for escaping 90 is made of a resin, metal, or the like into a square tube shape. Also, the guide member for escaping 90 is fixed to the outer periphery of the first windup device 36, more specifically, to the side surface of the first windup device 36, which faces the outside of the vehicle, by screwing or the like along the extension line of the moving path of the rack member 72 by the guide rail 66. The other-end-side portion of the rack member 72, which extends from the guide rail 66, is guided to be movable along the guide member for escaping 90.

<Overall Operation>

An overall operation of the window shade device for vehicles 20 is described.

First, in the initial state, the first window shade 32 and the second window shade 52 are housed (see FIG. 2).

In this state, a user or the like grasps the stay 34 of the first window shade 32 and moves the stay 34 upward. Then, the first window shade is drawn, and the windup shaft member 38 of the first windup device 36 rotates in the drawing direction. The first bevel gear 82 rotates in association with the rotation of the windup shaft member 38, and the second bevel gear 86 that meshes with the first bevel gear 82 rotates. The spur gear 88 rotates in association with the rotation of the second bevel gear 86, and the rack member 72 that meshes with the spur gear 88 is sent out to the guide rail 66 side. Then, the movable member 64 moves toward the drawing direction side along the guide rail 66, and draws the second window shade 52 via the quarter stay 54.

In the state in which the first window shade 32 is drawn so as to shield approximately the whole of the rear side window 10, the movable member 64 has moved to the rear side of the guide rail 66. This results in the state in which the second window shade 52 is drawn until approximately the whole of the rear quarter window 12 is shielded.

After that, the hook part 34a of the stay 34 is hooked to the side portion of the vehicle that is located above the rear side window 10, which maintains the state in which the first window shade 32 and the second window shade 52 completely shield the windows 10 and 12.

When hooking of the hook part 34a of the stay 34 is released from the above-mentioned state, the first window shade 32 is wound up by the windup force of the windup shaft member 38 of the first windup device 36. The rotation force of the windup shaft member 38 on this occasion is transmitted to the rack member 72 via the first bevel gear 82, the second bevel gear 86, and the spur gear 88. As a result, the rack member 72 moves from the guide rail 66 and is sent out to the first windup device 36 side. Then, the movable member 64 moves toward the housing direction side along the guide rail 66, and moves the leading edge of the second window shade 52 toward the drawing direction side. Then, the second window shade 52 is wound up by the windup force of the second windup device 56. In the state in which the first window shade 32 is wound up completely by the first windup device 36, the second window shade 52 is also wound up completely by the second windup device 56.

According to the window shade device for vehicles 20 configured as described above, the force owing to the rotation of the first windup device 36 is transmitted as the force for moving the rack member 72 along the guide rail 66, through meshing of the first bevel gear 82 and the second bevel gear 86. Therefore, the positions in which the windup shaft member 38 of the first windup device 36 and the rack member 72 or the guide rail 66 are provided can be set relatively freely, which is excellent in flexibility in layout.

Moreover, the configuration is made such that the rack member 72 moves along the guide rail 66 upon the rotation of the windup shaft member 38 of the first windup device 36, and that the second window shade 52 is drawn upon the movement of the rack member 72. Accordingly, for example, a problem that occurs when the rack member 72, the movable member 64, or the like is caught is unlikely to occur. This enables to perform the operation of drawing the second window shade 52 more reliably.

For example, the angle between the axes of the first bevel gear 82 and the second bevel gear 86 can be set relatively freely. This enables to adjust the axial direction of the windup shaft member 38 of the first windup device 36, the moving direction of the rack member 72, and the extending direction of the guide rail 66 relatively freely. For this reason, the first window shade mechanism 30 and the second window shade mechanism 50 can be easily incorporated integrally in accordance with the layout of the place in which the window shade device for vehicles 20 is incorporated.

For example, in a case where the rear quarter window 12 is tilted with respect to the rear side window 10 to the room inside toward the vehicle rear, integration can be made easily while the guide rail 66 is tilted with respect to the first windup device 36 correspondingly to the tilted position.

The spur gear 88 having an axis of rotation that coincides with the axis of rotation 86X of the second bevel gear 86 is integrated therewith, and the spur gear 88 is configured to mesh with the rack member 72 to move the rack member 72. Accordingly, the rotation of the second bevel gear 86 can be transmitted as the force for moving the rack member 72 with a relatively simple configuration.

Moreover, the position at which the spur gear 88 and the rack member 72 mesh with each other is appropriately adjusted on the axis of rotation 86X of the second bevel gear 86 by, for example, adjusting the length of the shaft 87, so that the arrangement layout of the rack member 72 can be changed freely. For example, it is easy to dispose the rack member 72 at a position offset from the axis of the windup shaft member 38. Also from this point, the first window shade mechanism 30 and the second window shade mechanism 50 can be integrated with each other to be easily incorporated in accordance with the layout of the place in which the window shade device for vehicles 20 is incorporated.

The first bevel gear 82 is directly connected to the windup shaft member 38 of the first windup device 36, whereby the rotation can be transmitted from windup shaft member 38 to the first bevel gear 82 with a relatively simple configuration.

Further, the portion of the rack member 72, which extends from the guide rail 66, is guided by the guide member for escaping 90, and thus, the rack member 72 can be prevented from interfering with peripheral members, which enables the rack member 72 to move smoothly. Moreover, the guide member for escaping 90 is provided along the first windup device, and accordingly, the rack member 72 can be guided with a relatively compact configuration.

<Modifications>

The embodiment above has been described as an example of the present invention, and the present invention is not limited to the configuration described in the embodiment above.

For example, this embodiment has described the configuration in which the first window shade 32 is manually opened/closed, that is, the configuration in which the first window shade mechanism 30 does not include an opening/closing drive device such as a motor. However, this embodiment is similarly applicable also to a case of the configuration in which the first window shade mechanism 30 is driven for opening/closing by an opening/closing device such as a motor.

This embodiment has described the case in which the angle between the axes of the first bevel gear 82 and the second bevel gear 86 is not square, which is not necessarily required. The angle between the axes of the first bevel gear 82 and the second bevel gear 86 may be square, or the configuration may be made such that the rack member 72 moves along the axial direction of the windup shaft member 38 in parallel. An angle at which the first bevel gear 82 and the second bevel gear 86 mesh with each other, or a direction along which the rack member 72 moves may be appropriately set in accordance with a target in which the first window shade mechanism 30 and the second window shade mechanism 50 are installed.

While the spur gear 88 and the rack member 72 mesh with each other at a position offset from the axis of the windup shaft member 38 in this embodiment, those may mesh with each other on the axis of the windup shaft member 38. In this case, it suffices that the rack member 72 is guided to be movable along the winding path so as not to interfere with the windup shaft member 38.

While the present invention has been described above in detail, the foregoing description is in all aspects illustrative, and the present invention is not limited thereto. That is, numerous modifications and variations can be devised in the described aspects without departing from the scope of the invention.

DESCRIPTION OF REFERENCE NUMERALS 10 rear side window
12 rear quarter window
20 window shade device for vehicles
32 first window shade
36 first windup device
38 windup shaft member
52 second window shade
56 second windup device
60 guide and support mechanism
64 movable member
66 guide rail
70 shade associating mechanism
72 rack member
80 intermediate transmission mechanism
82 first bevel gear
86 second bevel gear
88 spur gear
90 guide member for escaping

The invention claimed is:

1. A window shade device for vehicles that covers a first window and a second window provided adjacent to each other in a vehicle to be shielded and opened, comprising:
a first window shade to shield said first window;
a first windup device including a windup shaft member to wind up said first window shade and winding up said first window shade to be drawn from or housed in said windup shaft member;
a second window shade to shield said second window;
a second windup device disposed in a position of intersecting an axis of the windup shaft member of said first windup device and winding up said second window shade to be drawn therefrom or housed therein;
a guide and support mechanism including a guide path member to be disposed along a drawing or housing direction of said second window shade and a movable member supported to be movable along the guide path member and connected to a drawing-side leading edge of said second window shade;
a rack member connected with said movable member, disposed to be movable along said guide path member, and moving said movable member along said guide path member by the movement along said guide path member; and
an intermediate transmission mechanism including a first bevel gear connected to the windup shaft member of said first windup device to rotate in association therewith and a second bevel gear disposed to mesh with said first bevel gear and be associated with said rack member, and transmitting the rotation of the windup shaft member of said first windup device as a force for moving said rack member along said guide path member, said second bevel gear being integrated with a shaft and a spur gear, said shaft having an axis of rotation that coincides with an axis of rotation of said second bevel gear and having a length dimension extending from said second bevel gear toward an axis of rotation of said first bevel gear across the axis of rotation of said first bevel gear, said spur gear being formed at a tip of said shaft to mesh with said rack member wherein said first bevel gear and said second bevel gear are disposed to mesh with each other in a position in which axes of rotation thereof are disposed not to be orthogonal to each other, and said rack member is provided to be movable along a direction in which said rack member is tilted with respect to the axis of the windup shaft member of said first windup device.

2. The window shade device for vehicles according to claim 1, wherein said spur gear and said rack member mesh with each other at a position offset from the axis of the windup shaft member of said first windup device.

3. The window shade device for vehicles according to claim 1, wherein said first bevel gear is directly connected to the windup shaft member of said first windup device.

4. The window shade device for vehicles according to claim 1, wherein a guide member for escaping that guides a portion of said rack member is provided along said first windup device, the portion extending from said guide path member.

* * * * *